(12) United States Patent
Dal Pra'

(10) Patent No.: US 7,918,514 B2
(45) Date of Patent: Apr. 5, 2011

(54) RIM FOR A BICYCLE WHEEL MADE FROM COMPOSITE MATERIAL WITH A WEAR INDICATOR AND WHEEL COMPRISING SUCH A RIM

(75) Inventor: Giuseppe Dal Pra', Zane (IT)

(73) Assignee: Campagnolo, S.r.l., Vicenza (IT)

( * ) Notice: Subject to any disclaimer, the term of this patent is extended or adjusted under 35 U.S.C. 154(b) by 15 days.

(21) Appl. No.: 12/128,341

(22) Filed: May 28, 2008

(65) Prior Publication Data
US 2008/0296961 A1 Dec. 4, 2008

(30) Foreign Application Priority Data

May 30, 2007 (IT) .............................. MI2007A1103

(51) Int. Cl.
*B60B 21/08* (2006.01)
(52) U.S. Cl. ................ 301/95.103; 301/95.102; 116/208
(58) Field of Classification Search .................... 301/6.9, 301/95.101, 95.102, 95.103, 95.107, 95.108, 301/95.11; 116/208; 188/24.11, 1.11 R, 188/1.11 W
See application file for complete search history.

(56) References Cited

U.S. PATENT DOCUMENTS

| | | | |
|---|---|---|---|
| 5,061,013 A | 10/1991 | Hed et al. | |
| 5,624,519 A | 4/1997 | Nelson et al. | |
| 6,270,104 B1 | 8/2001 | Nelson et al. | |
| 6,283,557 B1 * | 9/2001 | Okajima et al. | 301/95.104 |
| 6,347,839 B1 | 2/2002 | Lew et al. | |
| 6,354,668 B2 * | 3/2002 | Okajima et al. | 301/95.102 |
| 6,398,313 B1 | 6/2002 | Lew | |
| 6,418,873 B1 * | 7/2002 | Chen | 116/208 |
| 6,460,939 B1 * | 10/2002 | Claes | 301/95.101 |
| 6,679,561 B2 | 1/2004 | Addink et al. | |
| 6,991,300 B2 | 1/2006 | Colegrove | |
| 2006/0267397 A1 * | 11/2006 | Possarnig et al. | 301/95.102 |

FOREIGN PATENT DOCUMENTS

| | | |
|---|---|---|
| DE | 19729824 | 1/1998 |
| EP | 0579525 | 1/1994 |
| EP | 1134096 | 9/2001 |
| EP | 1231077 | 8/2002 |
| GB | GB2375743 | 11/2002 |
| JP | 11020763 A * | 1/1999 |
| WO | WO 9900259 A1 * | 1/1999 |
| WO | WO2004074010 | 9/2004 |

* cited by examiner

*Primary Examiner* — S. Joseph Morano
*Assistant Examiner* — Kip T Kotter
(74) *Attorney, Agent, or Firm* — Volpe and Koenig PC

(57) ABSTRACT

A composite rim (1) for a bicycle wheel (60). The rim has at least one braking surface (20) and a wear indicator (40) that indicates when a predetermined level of wear has been reached at the braking surface (20). The wear indicator (40) is arranged in the rim (1) so that its does not affect the outer surface of the rim (1) or weaken its mechanical strength.

92 Claims, 15 Drawing Sheets

RIM FOR A BICYCLE WHEEL MADE FROM COMPOSITE MATERIAL WITH A WEAR INDICATOR AND WHEEL COMPRISING SUCH A RIM

FIELD OF INVENTION

The present invention concerns a rim for a bicycle wheel made from composite material and a bicycle wheel comprising such a rim.

BACKGROUND

A rim for a bicycle wheel has a structure that extends between two opposite sides, connected by one or more bridges to form a U-shaped, inverted A-shaped or more complex section, with a plurality of chambers. In wheels with pad brakes, generally on the left and right sides of the rim, braking positions are formed on the rim where the brake pads are to be pressed to brake the bicycle.

The extensive search for lightness in bicycle wheels has led to rims being made with ever lower thicknesses. In extreme cases, there is a bearing structure of the rim that is only a little more than sufficient to withstand the loads to which it is subjected. As a result of this, the rim wear caused by brake pad rubbing must be watched carefully. Excessive rim wear at the braking surfaces is unsafe, since it can lead to the rim suddenly collapsing in dangerous situations requiring very hard braking. Therefore, it is necessary to indicate the rim's wear level so a cyclist knows when to replace the rim.

Rims made from metallic material comprise annular or pointed recesses formed on the braking surfaces. The depth of the recess decreases with wear. When the recess disappears, the cyclist must replace the rim. Annular recesses are easy to make during extrusion of semi-worked product from which the rim is formed or by machining. Pointed recesses, on the other hand, are made by machining or by upsetting.

For rims made from composite material, typically made with structural fibers in a matrix of polymeric material, it is not possible to make the recesses by extrusion or upsetting and machining the recesses would shear the structural fibers and weaken the rim.

Consequently, the present invention concerns a rim for a bicycle and a bicycle wheel made from composite material.

SUMMARY

A rim for a bicycle wheel made from composite material according to the invention includes two opposite sides on which two respective braking races surfaces are formed that are subject to wear as a consequence of braking The rim includes, at at least one of said braking surfaces, at least one first outer or outermost layer, and a wear indicator, suitable for indicating when a predetermined or critical wear level has been reached by the rim at the braking surfaces, arranged in the rim in an inner position with respect to the first outermost layer. The wear indicator is positioned beneath at least one of the braking surfaces at a predetermined distance from the surface so that it becomes exposed when the surface is worn by this distance.

BRIEF DESCRIPTION OF THE FIGURES

Further characteristics and advantages of the present invention shall become clearer from the following detailed description of some preferred embodiments thereof, made with reference to the attached drawings. In such drawings.

DETAILED DESCRIPTION OF THE PREFERRED EMBODIMENTS

Introduction to the Embodiments

Figure 1:
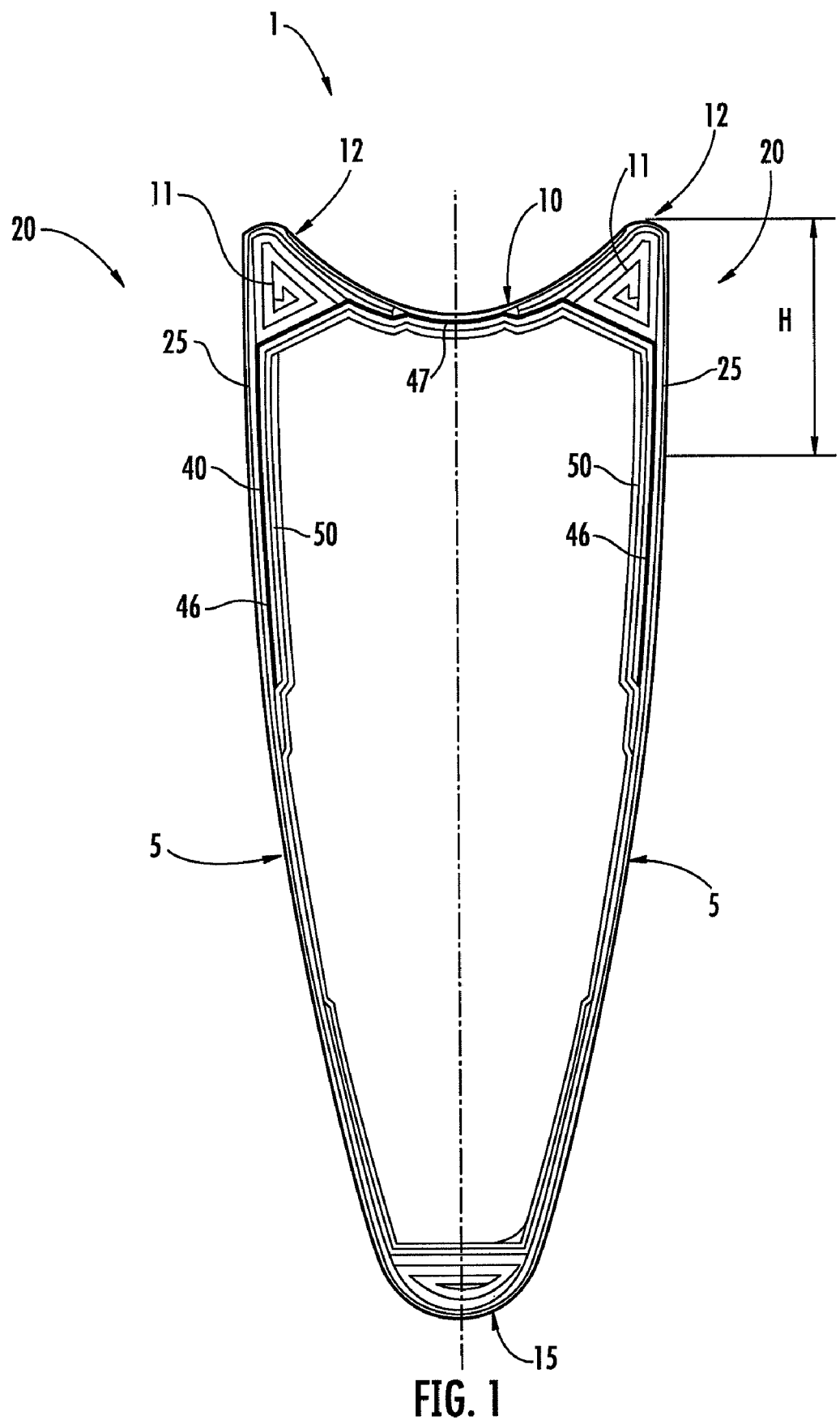
FIG. 1 is a section view of a rim according to a first embodiment of the invention.

In this way, the wear indicator does not affect the outer surface of the rim and therefore its mechanical strength.

According to a preferred embodiment, the wear indicator comprises at least one second, middle, intermediate layer, having a visible characteristic that contrasts with the outer layer. Thus, when the outer layer is worn away, the predetermined wear level has been reached at the braking surfaces and the underlying second middle layer becomes clearly visible.

The visible characteristic is preferably an indicating color, different than the color of the outer layer. The indicating color is a color that can clearly be seen and can be obtained relatively easily.

The middle layer is preferably made from composite material with structural fibers in a matrix of polymeric material and at least one of said structural fibers, preferably a plurality or a totality thereof, has said indicating color. Alternatively or in addition, the matrix of polymeric material has said indicating color.

In this way, the indicator consisting of the middle layer is structurally a part of the rim, which can contribute together with the outer and with other layers, to the rim's mechanical strength.

Preferably, said at least one fibers having said indicating color continuously wraps around the entire radial extension of the braking surface. This ensures indication of when the wear limit has been reached when the rim wear on the braking surfaces is not uniform, such as when the brake pads are misaligned. This also ensures an optimal mechanical strength of the middle layer.

Preferably, the fiber or fibers having said indicating color are aramid fibers, such as Kevlar® fibers that are easier to color. Nevertheless, glass or ceramic fibers and combinations of the above can also be used.

According to a preferred solution, an outer layer made from composite material comprising carbon fibers in a matrix of polymeric material is associated with a middle layer with at least one colored aramid fiber. Even more preferably all of the fibers of the middle layer are colored aramid fibers. Since carbon fibers are black, the aramid fibers shall be a different color than black, for example yellow.

Preferably, the middle layer having the indicating color is visible through a valve hole or a spoke attachment hole. This allows the user and the manufacturer to directly check for the presence of the wear indicator on a new rim.

Preferably, the predetermined or critical wear level corresponds to complete wear of either the outer or middle layers at the braking surfaces. In both cases, the predetermined wear level can also be an initial warning level if the whole of the remaining levels, although reduced, is still sufficient to maintain an adequate safety margin or an alarm level if the whole of the remaining layers is sufficient to maintain the structural integrity of the rim.

Preferably, the outer layer has a thickness of between 0.1 and 0.8 mm, more preferably between 0.3 and 0.5 mm. The middle layer has a thickness preferably between 0.2 and 1 mm, more preferably between 0.4 and 0.8 mm.

According to another preferred embodiment, the wear indicator comprises a metallic element. In this case, the wear of the rim can be detected through a suitable sensor device, housed on the bicycle in a suitable position opposite the braking surfaces. The sensor device can comprise for example an electromagnetic field generator extending so far as to include the rim and the metallic element, and an electrical magnitude that varies as the amount of composite material arranged between the sensor device itself and the metallic element varies. This embodiment is preferred for bicycles equipped with a bicycle computer, which can therefore provide wear indication information to the cyclist.

According to a preferred embodiment, the wear indicator comprises an inductive sensor. In this case, the wear of the rim can be detected through a suitable sensor device, housed on the bicycle in a suitable position opposite the braking surfaces; the sensor device can, for example, comprise an electromagnetic field detector generated by the inductive sensor to detect an electrical magnitude that varies as the amount of composite material arranged between the sensor device itself and the inductive sensor varies. This embodiment is also preferred for bicycles equipped with a bicycle computer, which can therefore provide the wear indication information to the cyclist.

Preferably, the metallic element or the inductive sensor is incorporated in the composite material in an inner position with respect to the outer layer. The metallic element can have any configuration, for example it can be formed from one or more plates or one or more wires.

Both the metallic element and inductive sensor can be detected with X-rays, for example, even when the wheel is not worn, to ensure their presence before selling the rims.

Preferably, the wear indicator extends in the circumferential direction on at least one part of the rim, and more preferably on the totality of the rim.

A single wear indicator can be provided at just one of the braking surfaces. Preferably, one respective wear indicator is provided at each of the respective braking surfaces since the rim can wear relatively more at one of the two braking surfaces.

Preferably, the wear indicator extends in the radial direction beyond the braking surfaces. This ensures that the worn area is actually covered by the wear indicator even when the indicator has been positioned imprecisely.

In a preferred embodiment, the braking surfaces are connected by an upper bridge and by a lower bridge. The wear indicator extends between at least one of the braking surfaces and the upper bridge. In another preferred embodiment, the braking surfaces are connected by an upper bridge and a lower bridge, and the wear indicator extends at at least one of the braking surfaces and the lower bridge.

In a preferred embodiment, the wear indicator extends in the radial direction for a height that is shorter than the height of the braking surfaces.

In a preferred embodiment, the braking surfaces are connected by at least one bridge and comprise left and right wings projecting radially outside of the bridge so as to form, together with the bridge, a space for holding a tire, in which the wear indicator extends at least partially on at least one wing.

Preferably, the rim also comprises at least one middle layer, in an inner position with respect to the outer layer; more preferably, the middle layer has structural capacity. By this expression it is meant that the layer has mechanical strength such as to significantly contribute to the mechanical strength of the rim.

Preferably, the middle layer is made from composite material with structural fibers in a matrix of polymeric material. More preferably, the structural fibers of the middle layer are aramid, glass or ceramic fibers.

Preferably, the outer layer is made from composite material with structural fibers, preferably bi-directional structural fibers in a matrix of polymeric material. Therefore, the outer layer also contributes to the mechanical strength of the rim. More preferably, the outer layer comprises at least two sheets of composite material one on top of the other, preferably having a thickness of between 0.1 and 0.3 mm. Alternatively, the outer layer does not have structural characteristics and therefore is only used to cover the middle layer until the predetermined conditions of wear are reached. This alternative is preferable should one wish to substantially avoid using a rim whose mechanical characteristics are damaged even if only minimally.

Preferably, the rim also comprises at least one inner or innermost layer, in an inner position with respect to the middle layer, more preferably of a different type to the middle layer and of the same type as the outer layer. Where the indicator is a color, this solution allows an additional way of operating, using two warning levels. The outer layer and middle layers have the indicating color. When the outer layer has completely worn down and the middle layer has become visible, a pre-warning level is given. Warnings for the replacement of the rim are given by the subsequent disappearance of the middle layer after it has also worn down.

According to a preferred embodiment, the presence of the wear indicator can also be detected when the rim has not yet worn down, for example and preferably through X-rays or else through a valve hole or a spoke attachment hole. This allows the user and the manufacturer to directly check for the presence of the wear indicator on a new rim.

DETAILED DESCRIPTION

With particular reference to FIGS. 1 to 4, a rim 1 made from composite material in accordance with the invention comprises two lateral sides 5 joined by an upper bridge 10 and a lower bridge 15 to form a tubular bearing structure.

The sides 5 each comprise a braking surface 20, or area on which the brake pads of a bicycle push against during braking, on which bicycle a wheel is mounted that comprises the rim 1. The rim 1 is of the so-called high profile type having, a very pronounced extension in the radial direction. The braking surfaces 20 are of a greater width than the width of the brake pads to allow a range of acceptable positions. Typically, braking surfaces are at the outer portions of the sides 5 for a height H, generally about 10-12 mm, but different dimensions are possible. The sides 5 have a greater thickness in the braking surface 20 area than in the other areas to account for the abusive action of the brake pads. 20.

At the braking surfaces 20, the sides 5 of the rim 1 comprise, an outer layer 25, made from composite material; the composite material comprises structural fibers incorporated in a matrix of polymeric material. The structural fibers are selected from the group consisting of carbon, glass, aramid, ceramic, boron, polyester fibers and combinations thereof. Black carbon fibers are preferred.

The arrangement of the structural fibers in the polymeric material can be a random arrangement of pieces or sheets of structural fibers, a substantially unidirectional ordered arrangement of fibers, a substantially bidirectional ordered arrangement of fibers, for example woven according to a weft and a warp, or a combination thereof. Preferably, the polymeric material of the matrix is thermosetting, and the matrix comprises an epoxy resin.

Figure 2:
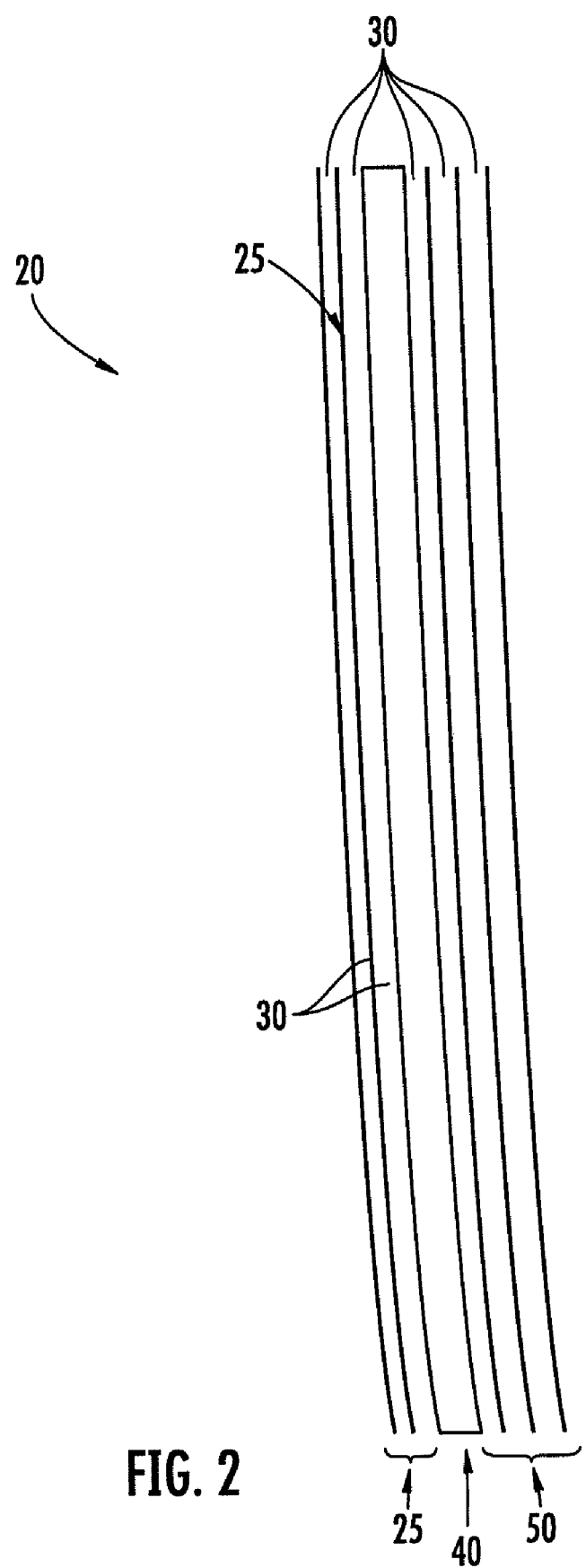
FIG. 2 is an enlarged section view of a portion of the rim of FIG. 1.
Figure 3:
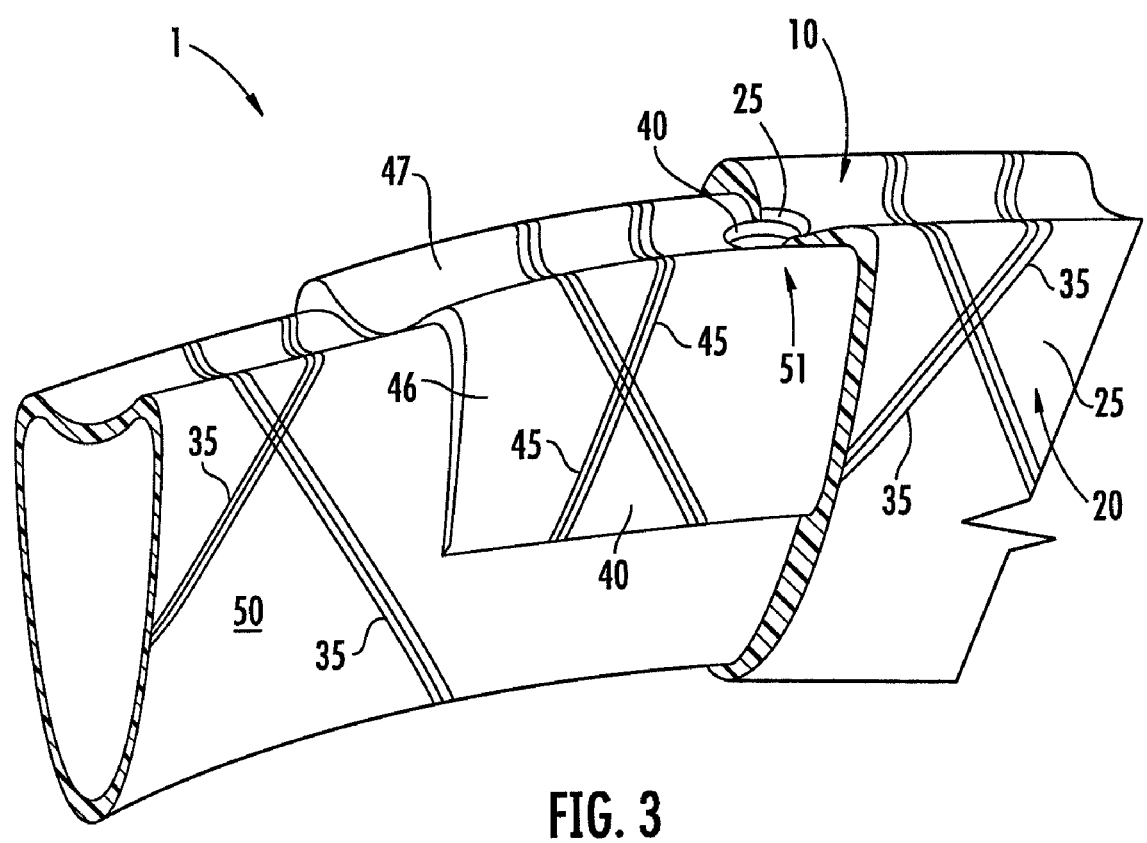
FIG. 3 is a perspective view with parts partially removed of a portion of the rim of FIG. 1.

Preferably, as shown in FIGS. 2 and 3, the composite material is made with piled up sheets 30 comprising continuous bidirectional fibers 35. The sheets 30 preferably have a thickness of between 0.1 and 0.3 mm.

The outer layer 25 preferably has a thickness of between 0.1 and 0.8 mm, even more preferably between 0.3 and 0.5 mm, therefore the outer layer 25 is preferably formed from two sheets 30.

A middle layer 40, which serves as the wear indicator, is arranged immediately below the outer layer 25. Preferably, the middle layer 40 is also made from composite material, but has a visible characteristic contrasting with the outer layer 25. This characteristic is visible when the middle layer 40 is not covered by something else, such as the outer layer 25. Preferably, the visible characteristic is an indicating color, given to at least part of the middle layer 40. For example, the composite material of the layer 40 comprises aramid, ceramic or glass fibers 45, since they are relatively easy to color compared to other fibers, and an epoxy matrix, identical to that of the outer layer 25; aramid fibers, like for example Kevlar®, are preferred. The aramid fibers contribute to the structural strength of the rim whereas the matrix in common between the layers allows better linking. The fibers 45 preferably have the same ordering of the fibers 35 as the outer layer 25, and in any case continuous fibers are preferred in the areas of the braking surfaces 20.

For the middle layer 40 to form a wear indicator, at least one of the fibers 45 of layer 40 (preferably a multiple of or all of them) has said indicating color. The polymeric matrix can also be colored with said indicating color.

The middle wear indicator layer 40 is preferably between 0.2 and 1 mm, and even more preferably between 0.4 and 0.8 mm thick, which, can be obtained by piling up one or more sheets 30 of composite material.

In the embodiment illustrated in FIGS. 1 and 3, the middle wear indicator layer 40 comprises portions 46 extending for part of the height of both of the braking surfaces 20 and connected together through an upper portion 47, incorporated in the bridge 10. The portions 46 extend on the sides 5 beyond the braking surfaces 20, in a radially inner direction. This configuration of the middle wear indicator layer 40 allows a more stable positioning during the lamination steps of the rim 1 and therefore reduces the risk of the layer 40 not being positioned at the braking surfaces 20 due to accidental movements during lamination. The upper bridge 10, at its side ends, comprises two thickened areas formed from sheets 11 wound upon themselves and arranged to form annular seams 12, surrounded on the outside by the outer layer 25. The middle wear indicator layer 40 is not arranged between the filling sheets 11 of the seams 12 and the outer layer 25, given that the portions 46 and 47 are joined at a point radially below such filling sheets 11.

The upper bridge 10 comprises a hole 51 to allow the passage of an inflation valve (not shown) of a tire associated with the rim 1, and other spoke attachment holes for the assembly of spokes for connection of the rim 1 to a hub. The hole 51 (and/or possibly the spoke attachment holes) also crosses the connection portion 47 of the middle layer 40 and makes it possible to visually check whether the wear indicator layer 40 has been inserted during construction.

An inner layer 50, preferably of the same material as the outer layer 25, is also preferably provided below, or in an inner position with respect to, the middle wear indicator layer 40. As can be seen more clearly in FIG. 2, the inner layer 50 preferably consists of at least three sheets 30, with an overall thickness of the layer of between 0.2 and 1 mm, more preferably between 0.4 and 0.8 mm.

The fibers 35 of the inner layer 50 are preferably continuous, i.e. without interruption, at the braking surfaces 20.

Figure 4:
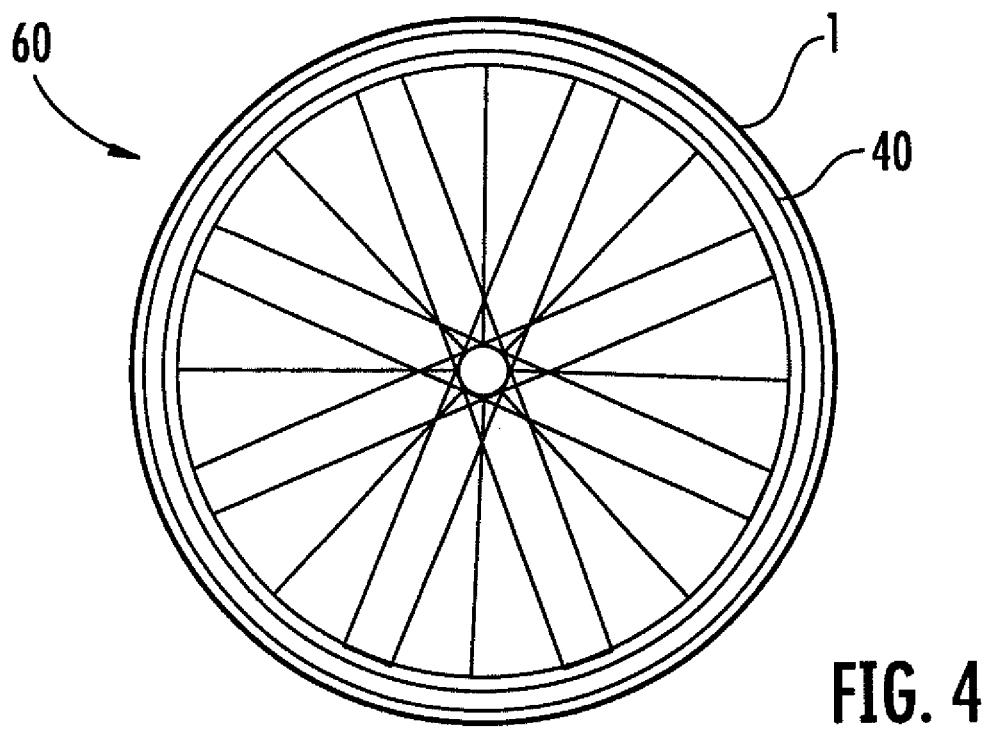
FIG. 4 is a side view of a bicycle wheel with the rim of FIG. 1.

The middle wear indicator layer 40 is an annular layer, extending in the circumferential direction on the totality of the rim 1, as can be seen in FIG. 4 that illustrates a wheel 60 that comprises the rim 1.

The invention described above with reference to the rim 1 can also be actuated in different ways. Some different embodiments shall be described hereafter with reference to FIGS. 5 to 12.

Figure 1A:
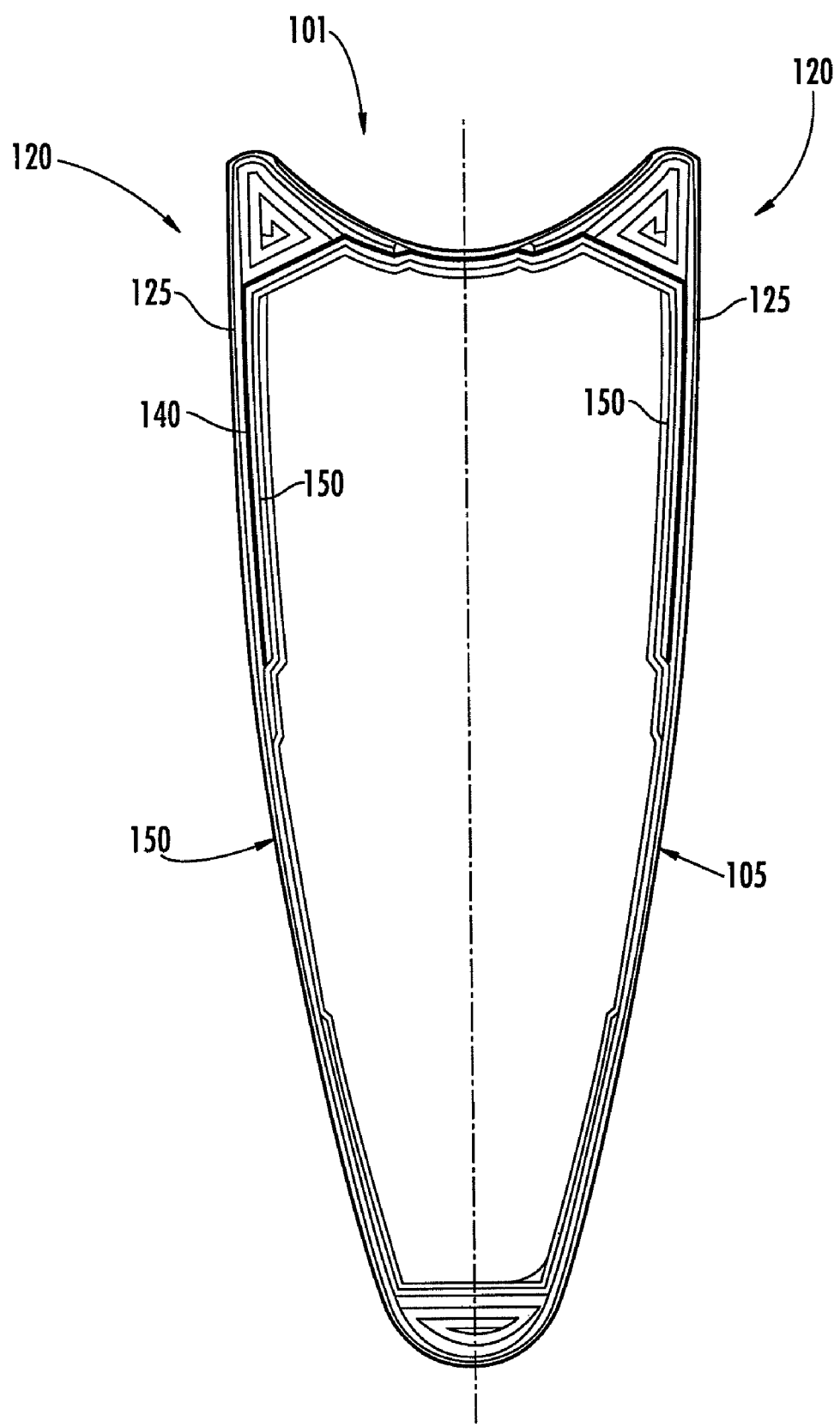
FIG. 1a is a section view according to another embodiment.
Figure 5:
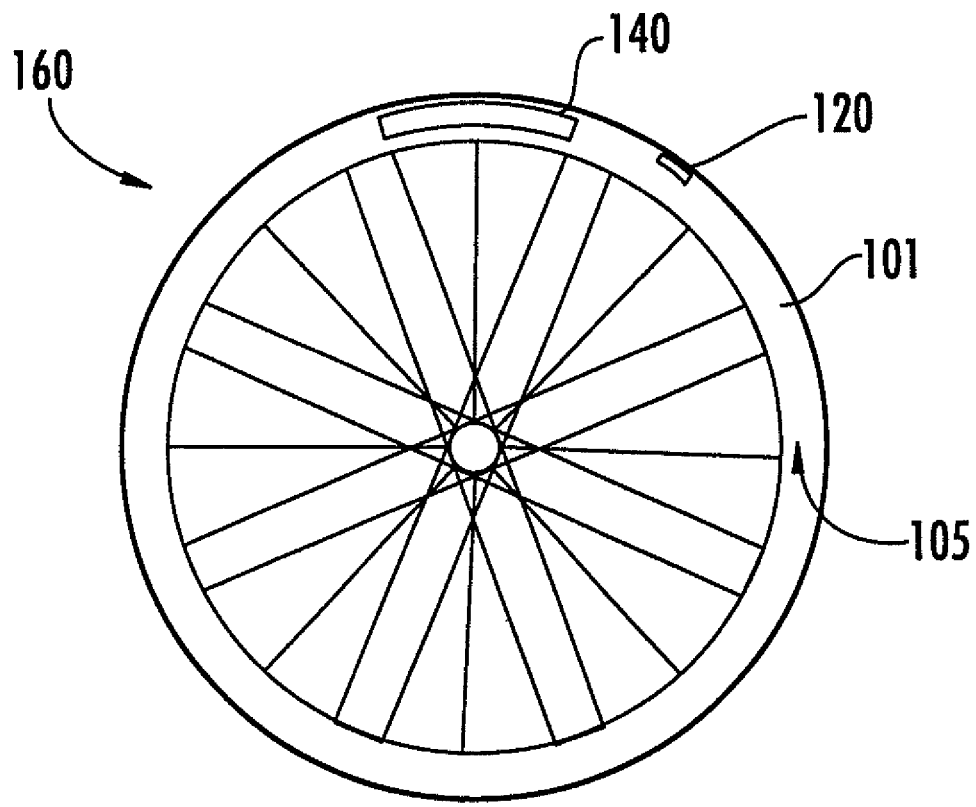
FIG. 5 is a side view of a bicycle wheel with a rim according to another embodiment of the invention.

FIGS. 5 and FIG. 1a in cross-section show a wheel 160 with a rim 101 similar to the rim 1 (i.e. with sides 105, braking surfaces 120, an outer layer 125, a middle layer 140, and a third layer 150), in which, however, the middle wear indicator layer 140 is only provided in one sector.

Figure 6:
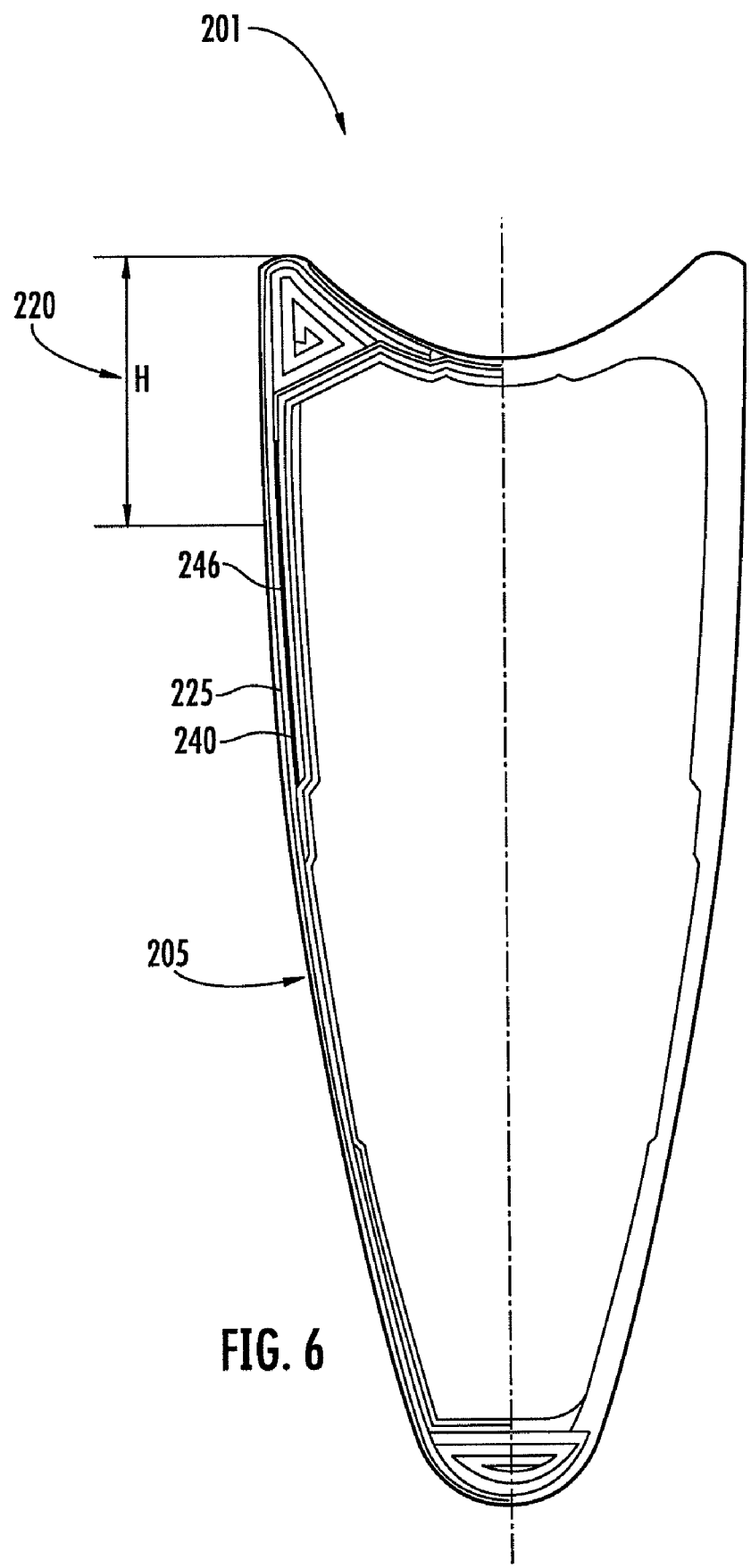
FIGS. 6 to 12 are section views of rims according to other embodiments of the invention.

FIG. 6 shows a rim 201 similar to the rim 1 (i.e. with sides 205, braking surfaces 220, a outer layer 225 and a middle layer 240), equipped, however, with a middle wear indicator layer 240 in which there is just a portion 246, extending for part of the height H of just one of the two braking surfaces 220 and also beyond, in a radially inner direction.

Figure 7:
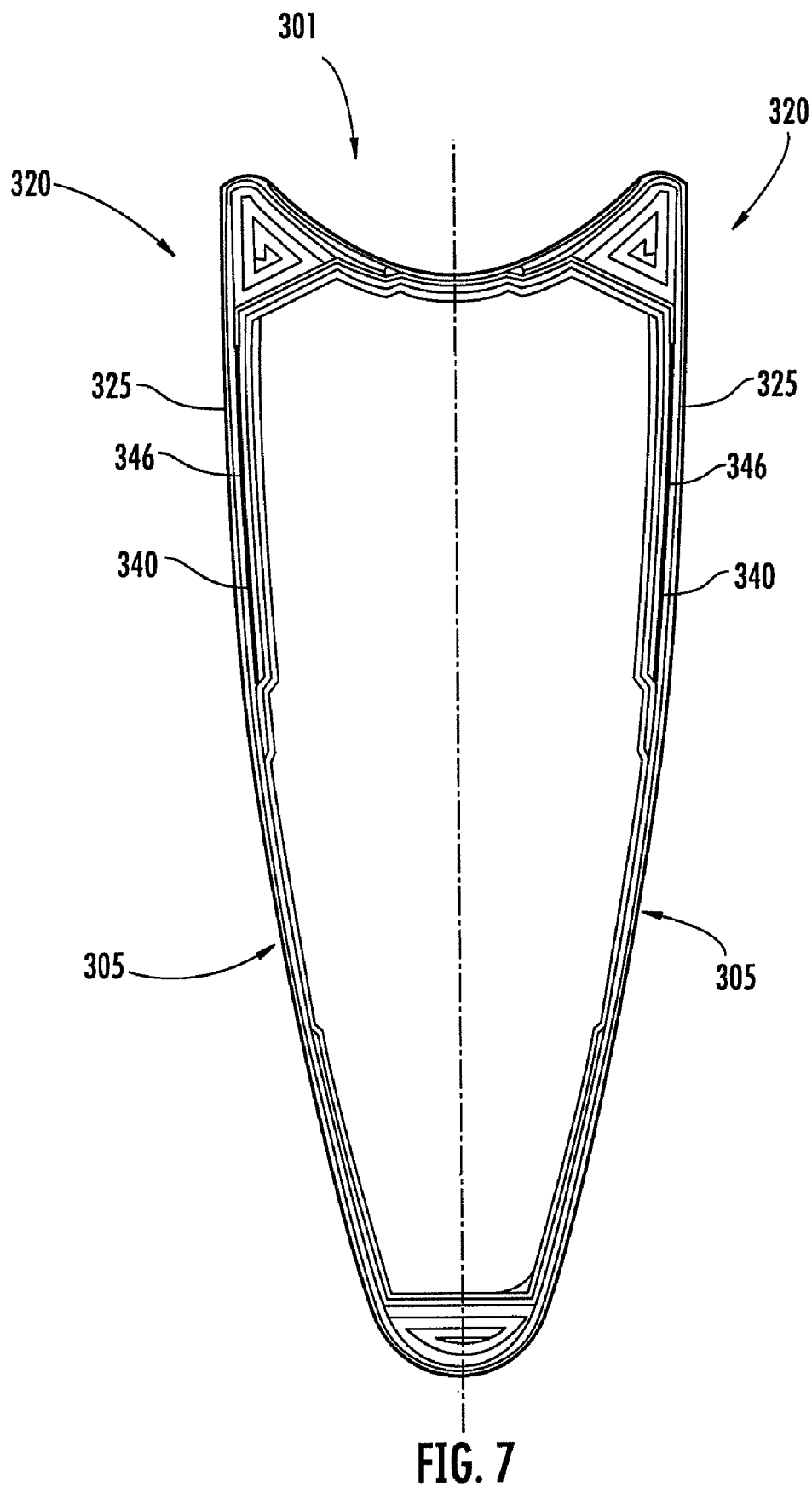

FIG. 7 shows a rim 301 similar to the rim 1 (i.e. with sides 305, braking surfaces 320, a outer layer 325 and a middle layer 340), in which, however, the middle wear indicator layer 340 comprises two separate portions 246, one for each of the two braking surfaces 20, and no connection portion between them.

Figure 8:
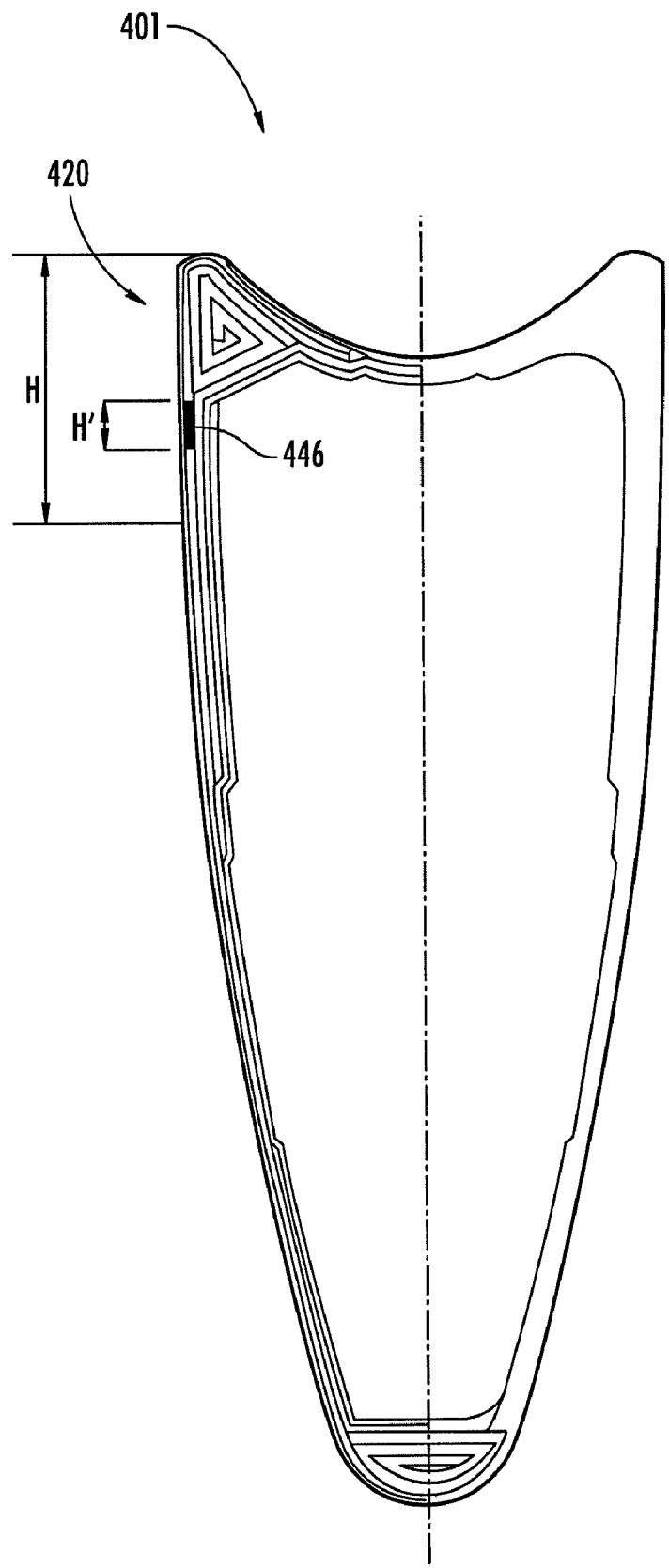

FIG. 8 shows a rim 401 similar to the rim 1 (i.e. with sides 405, braking surfaces 420, a outer layer 425 and a middle layer 440), equipped, however, with a middle wear indicator layer 440 in which there is just a portion 446 extending for a portion H' of the height H of just one of the two braking surfaces 420.

Figure 9:
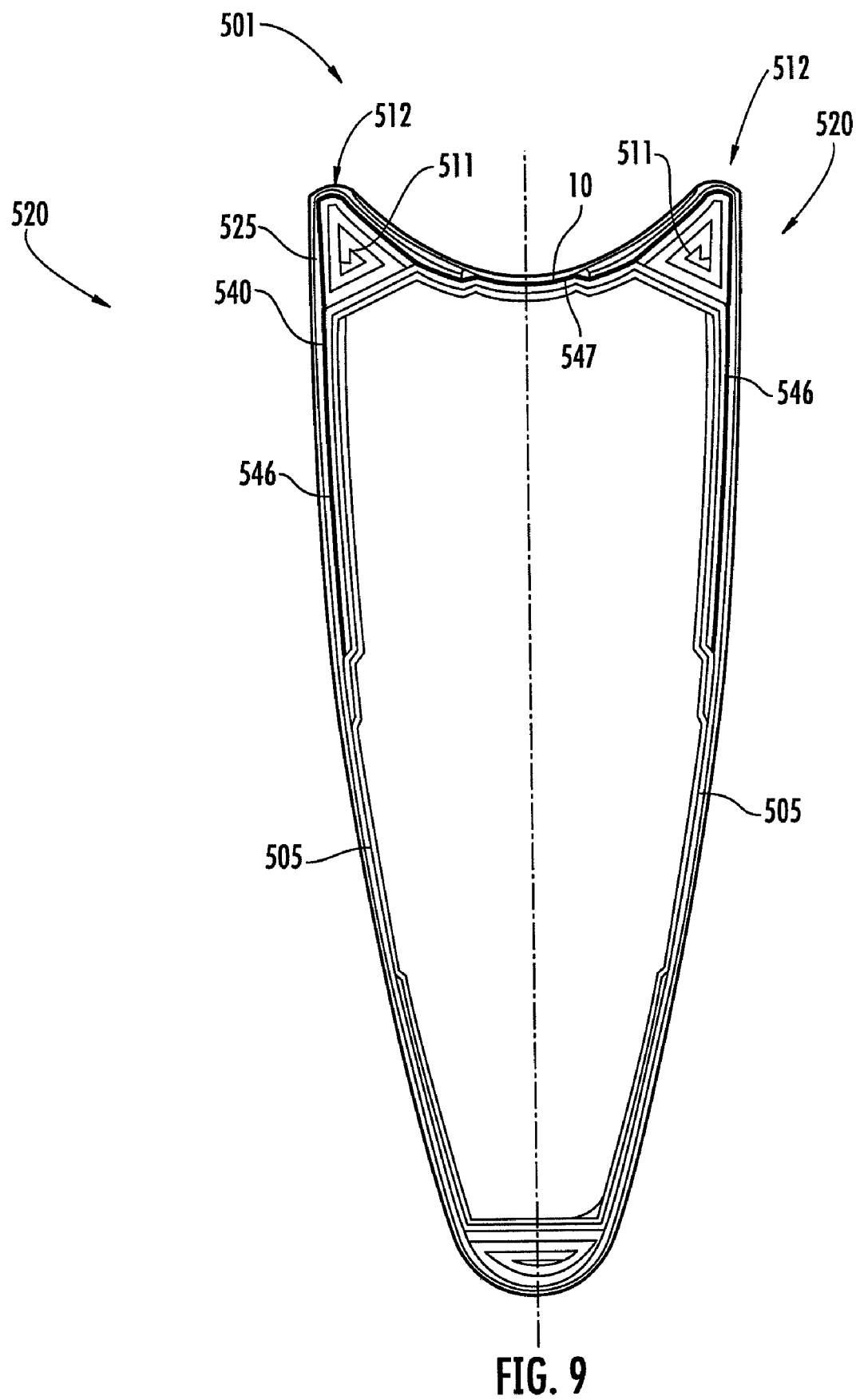

FIG. 9 shows a rim 501 similar to the rim 1 (i.e. with sides 505, braking races surfaces 520, a outer layer 525 and a middle layer 540), in which, however, the middle wear indicator layer 540 (in turn comprising lateral portions 546 connected by an upper portion 547) is arranged between filling sheets 511 of seams 512 and the outer layer 525, so as to extend for the entire height H of the braking surfaces 520.

Figure 10:
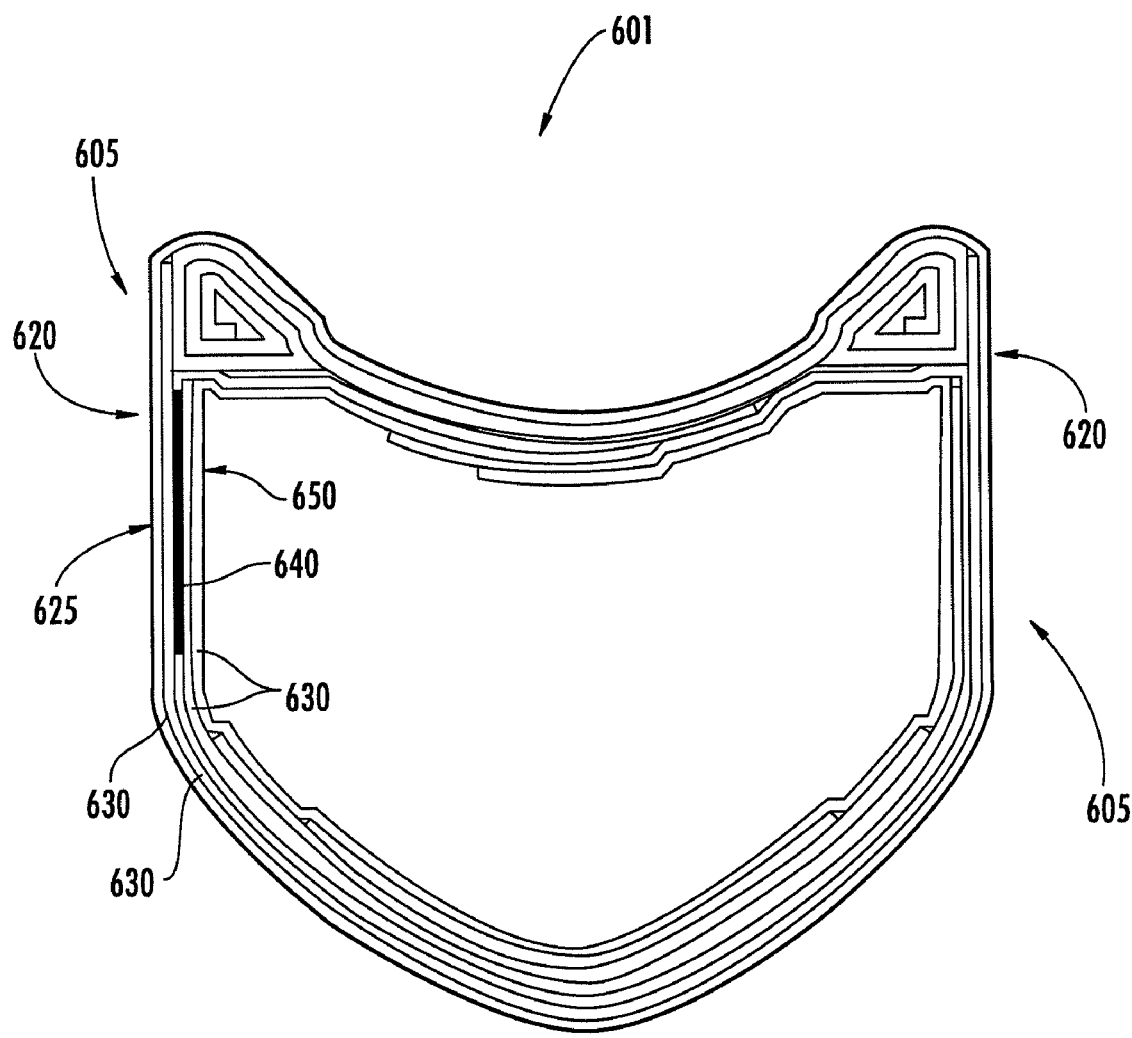

FIG. 10 shows a rim 601 similar to the rim 1 (i.e. with sides 605, braking surfaces 620, an outer layer 625 and a middle layer 640), however of the so-called low profile type; in such a rim 601, the braking surfaces 620 substantially coincide with the entire sides 605. The structure of the rim 601 is more robust and therefore the middle wear indicator layer 640 is inserted between a outer layer 625 and an inner layer 650 both formed from two sheets 630, similar to the sheets 30 of the rim 1. Therefore, both the layer 625 and the layer 650 have a thickness of between 0.2 and 0.6 mm.

Figure 11:
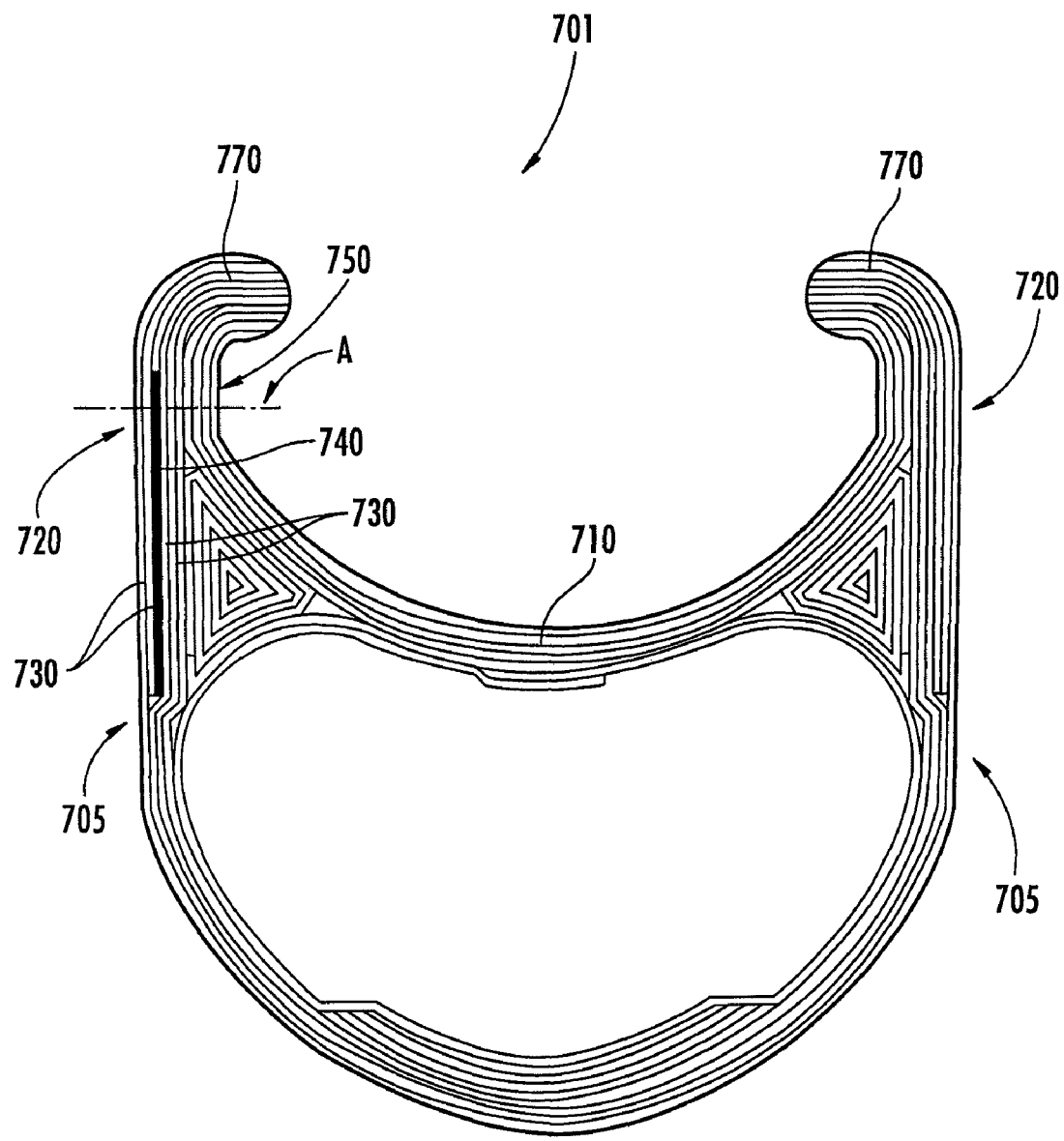

FIG. 11 shows a rim 701 similar to the rim 1 (i.e. with sides 705, braking surfaces 720, a outer layer 725 and a middle layer 740), however of the type intended to house the clincher type, the difference compared to the rims illustrated previously is the presence of two wings 770, for holding the clincher tire that project radially outwards from the upper bridge 710, as an extension of the sides 705. The braking surfaces 720 also comprise part of the wings 770 and thus are moved radially further out with respect to the rims, mostly at the upper bridge 710.

With this type of rim, the greatest risk of wear is at the wings 770, which, if made excessively thin, can yield under the pressure of the tire, causing it to go flat or disconnect from the rim. Therefore, the middle wear indicator layer 740 preferably engages at least the section A for attachment of the wings 770 to the upper bridge 710. Also in this case it is preferable for there to be an inner layer 750, comprising at least two sheets 730 with continuous structural fibers below the middle wear indicator layer 740.

Although the rim 701 for a clincher tire illustrated is of the low profile type, high profile types could also be used, which differ from the type of FIG. 11 in that the sides 705 are higher in the radial direction.

Figure 12:
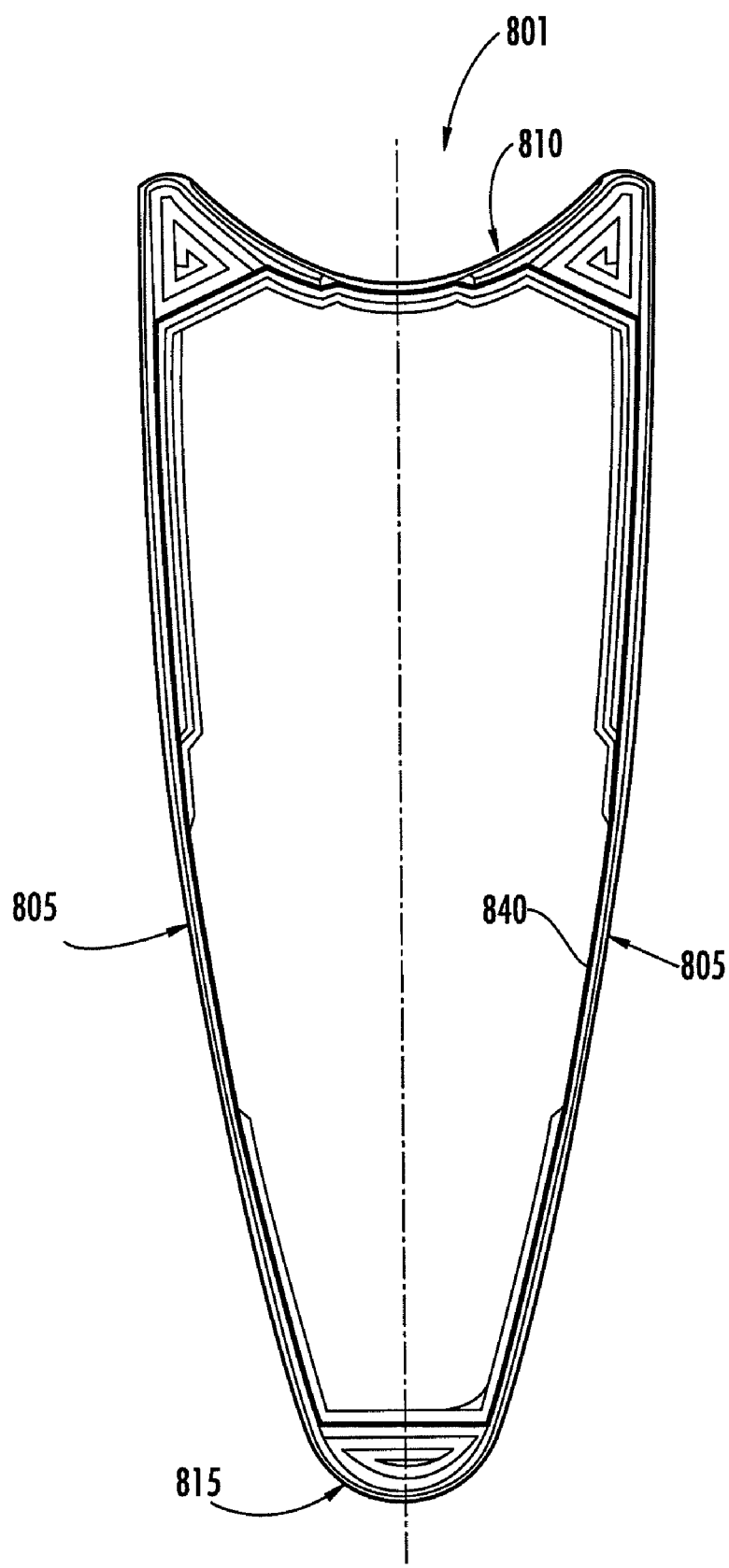

FIG. 12 shows a rim 801 similar to the rim 1 (i.e. with sides 805, braking surfaces 820, a outer layer 825 and a middle layer 840), in which, however, the middle wear indicator layer 840 extends continuously on the sides 805 of the rim and on the lower bridge 815. Preferably, the middle wear indicator layer 840 also extends on the upper bridge 810.

Figure 13:
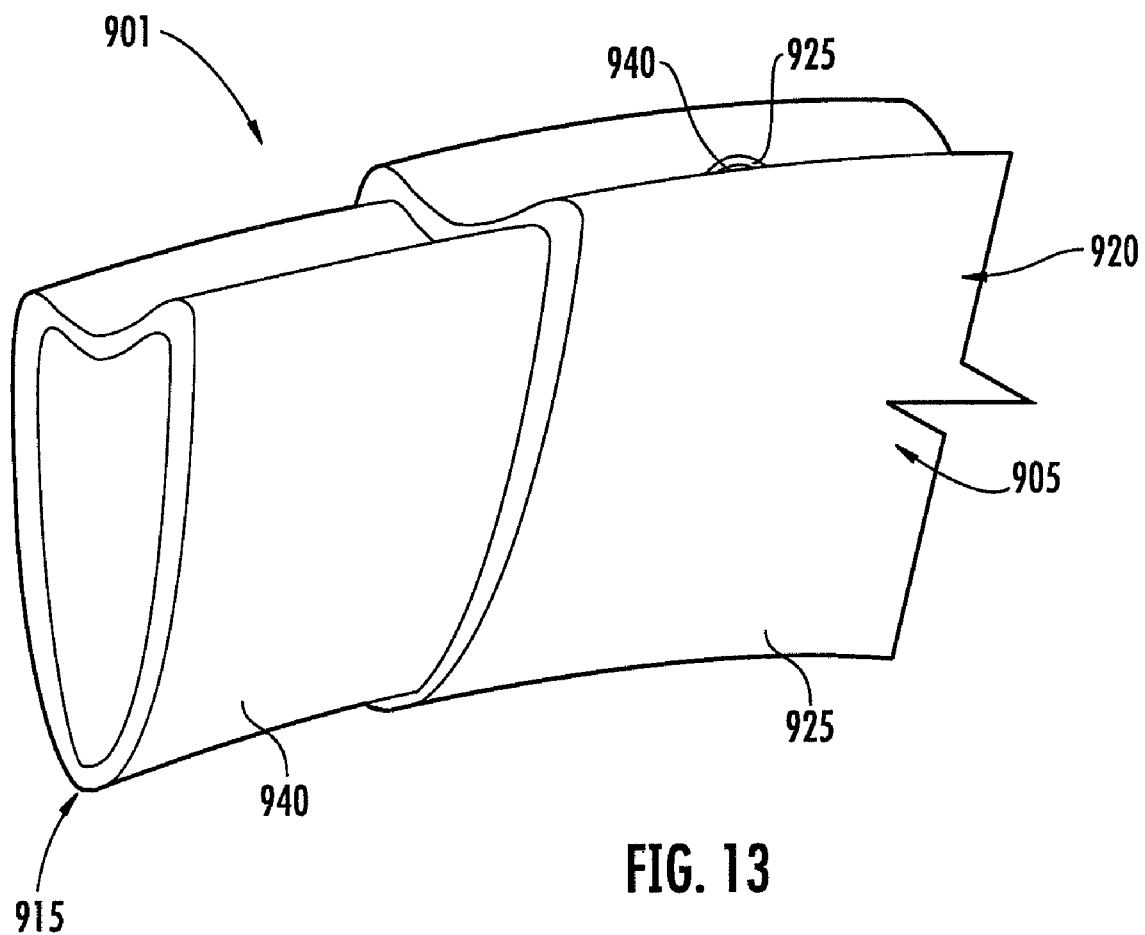
FIGS. 13 to 15 are perspective views, with parts partially removed, of portions of rim according to other embodiments of the invention.

FIG. 13 shows a rim 901 similar to the rim 1 including sides 905, a braking surface 920, and a lower bridge 915, in which, the middle wear indicator layer 940 is sized so as to perform by itself the task of a bearer structure of the rim 901 when the outer layer 925 has worn down, without needing an inner layer. In this case, the middle wear indicator layer 940 has a thickness of between 0.2 and 1 mm, and even more preferably between 0.4 and 0.8 mm, and could be formed from at least three sheets.

The indication of wear in all of the rims described above is based upon the complete wear of the outer layer. When such an outer layer is completely worn down (at at least one of the braking surfaces), the middle indicating layer becomes visible.

According to the structure of the rim, the appearance of the middle layer can be an alarm that indicates the need to replace the rim more or less immediately (if the whole of the remaining layers is sufficient to maintain the structural integrity of the rim) or else it can be a pre-warning that suggests that the wear be checked with a view to imminent replacement (if the whole of the remaining layers —although reduced—is still sufficient to maintain a suitable safety margin). In this last case, a subsequent warning signal is provided, given the disappearance of the middle indication layer because it has in turn worn down; this is possible only in the presence of an inner layer. Also, the inner, middle, and outer layers can be multiple shaded or colored with different tones.

In both cases, for rims for tubular and clincher tires, a tire type with medium profile, with a radial extension of the intermediate sides between that of the types with high and low profile, can also be provided.

Each type can have a middle wear indicator layer formed from a single side portion, like the portion 246 of the rim 201 of FIG. 6, or from two separate side portions, like the portions 346 of the rim 301 of FIG. 7, or else from two side portions connected by an upper portion, like the portions 46 and 47 of the rim 1 of FIGS. 1 to 4 or the portions 546 and 547 of the rim 501 of FIG. 9.

In all of the embodiments in which there is both an outer layer and an inner layer distinct from the middle wear indicator layer, the latter can also consist of a colored resin film, preferably epoxy, of the same type as the matrices used in the other layers. In this case, the middle wear indicator layer does not have structural capacity because it has no fibers.

In all of the embodiments, the outer layer is removable and can also be without structural capacity, i.e. fiberless. The inner layer and/or middle wear indicator layer have fibers and therefore structural capacity. The inner layer and/or the middle wear indicator layer can indicate when the risk of damaging the bearing structure occurs.

The crossed arrangement (for example woven) of the fibers in the layers illustrated represents the preferred embodiment, but other arrangements could be adopted, like unidirectional arrangements or alternation of layers with fibers with different arrangements.

As an alternative indication through a visible characteristic that appears following wear of the outer layer, a metallic element or an inductive sensor can be inserted inside the rim. In this embodiment the presence of the wear indicator in the rim can be detected using X-rays, for example.

Figure 14:
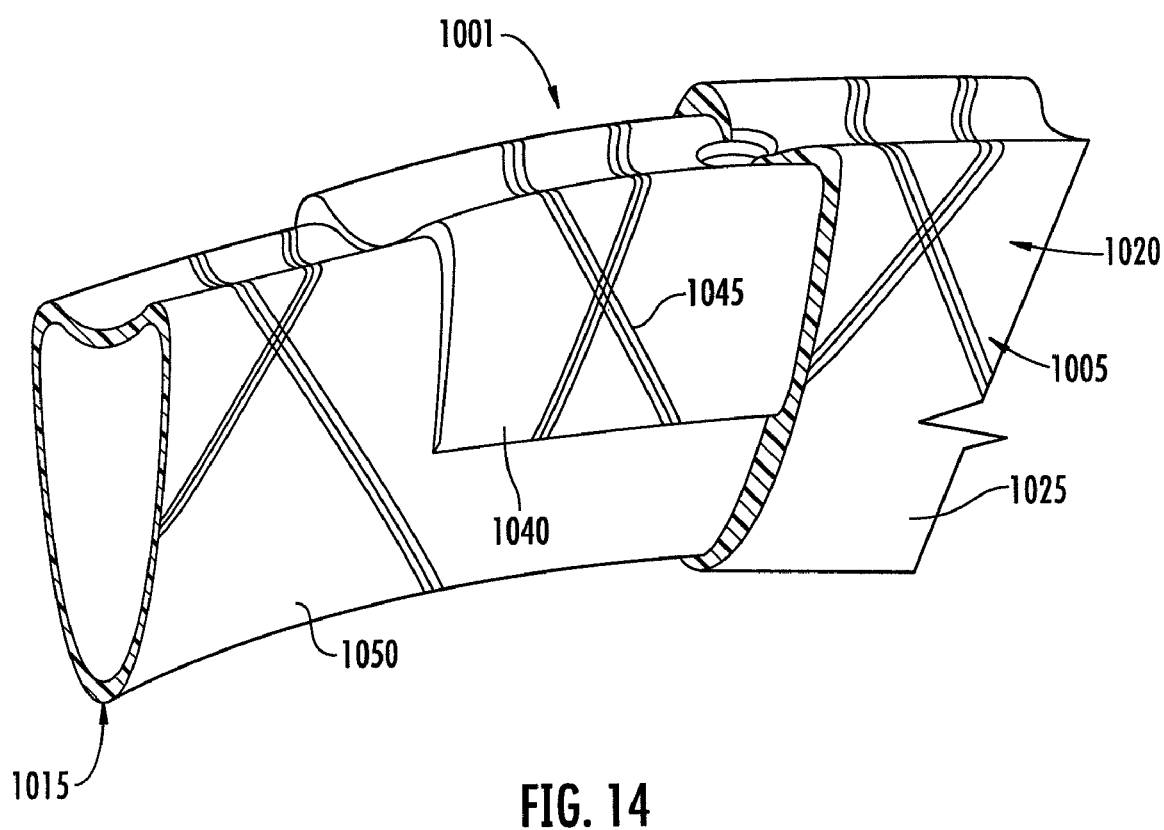

FIG. 14 shows a rim 1001 with a lower bridge 1015, sides 1005 and braking surfaces 1020, comprising three layers, 1025, 1040 and 1050, in which the wear indicator is formed from metallic fibers 1045 incorporated in the middle layer 1040 of composite material. In order to promote the integration with the composite material and to avoid movements during the steps of manufacture, the metallic fibers 1045 can be treated on the surface.

By using a rim 1001, it is possible to generate an electrical or magnetic signal with a sensor, for example arranged on the fork of the bicycle on which the rim 1001 is mounted or on a brake. The amount of material arranged between the metallic fibers 1045 and the sensor influences a measured electrical magnitude, based upon which it is thus possible to work out the residual thickness of the rim 1001 and based upon this to display a message on a control device for example mounted on the bicycle handlebars.

Figure 15:
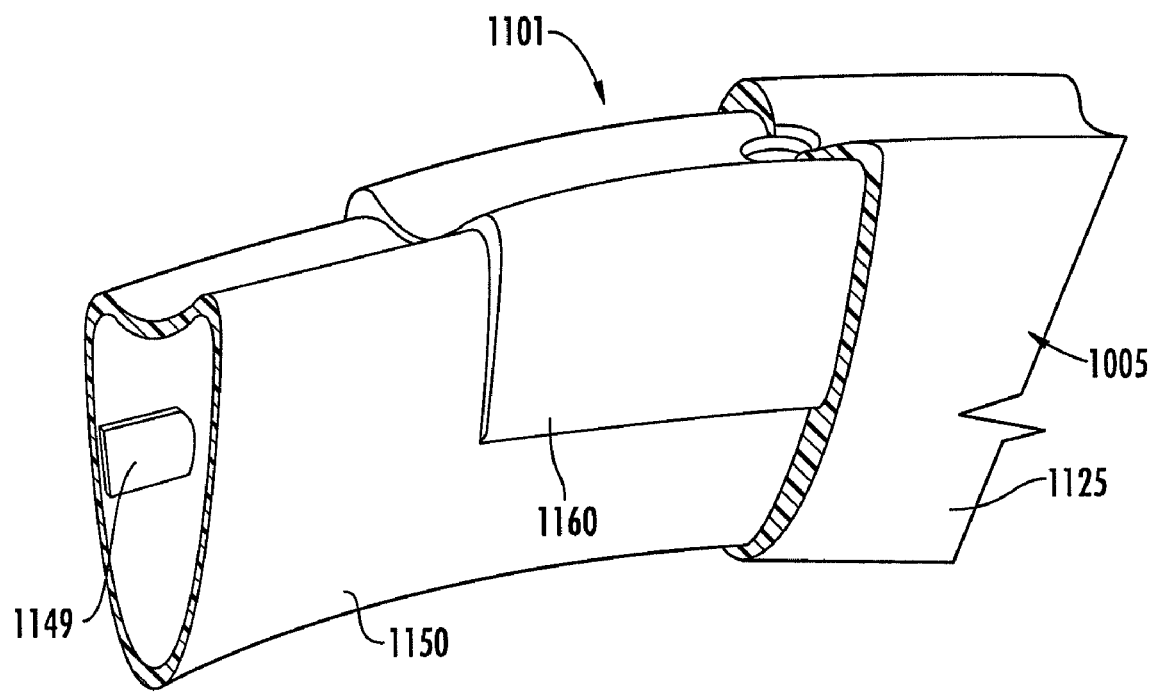

FIG. 15 shows a rim 1101 with sides 1105 and braking surfaces 1120, comprising three layers, 1125, 1140 and 1150, in which the wear indicator is an inductive sensor 1149, applied inside the tubular cavity of the rim 1101; it is possible to obtain the thickness of the rim 1101 in real time and generate a warning signal that is transmitted to a receiver or an antenna when the thickness has reduced by a predetermined amount. The inductive sensor 1149 can communicate with the control device, for example, via radio.

Other embodiments are also possible and one skilled in the art could combine the individual characteristics of the embodiments described above.

The invention claimed is:

1. A composite bicycle rim comprising:
    two opposite sides which define respective braking races that are subject to wear as a consequence of braking, the two opposite sides joined by an upper bridge having two thickened end portions comprised of folded sheets of composite material, the braking races having:
    at least one outer layer formed from composite material that forms the braking races and encloses the folded sheets of composite material of the upper bridge,
    and a middle layer positioned such that contact between the folded sheets of composite material and the at least one outer layer is uninterrupted, the middle layer having at least one wear indicator arranged in the rim in an inner position at a predetermined level with respect to the at least one outer layer so that it becomes exposed when the at least one outer layer wears down to the predetermined level.

2. The rim according to claim 1 wherein the wear indicator has a visible characteristic contrasting with the at least one outer layer.

3. The rim according to claim 2 wherein the visible characteristic is an indicating color different from a color of the at least one outer layer.

4. The rim according to claim 3 wherein the middle layer is made from composite material with structural fibers in a matrix of polymeric material and wherein at least one of said structural fibers has said indicating color.

5. The rim according to claim 4 wherein a plurality of said structural fibers have said indicating color.

6. The rim according to claim 5 wherein a totality of said structural fibers have said indicating color.

7. The rim according to claim 4 wherein said at least one of said structural fibers having said indicating color wraps without interruptions around an entire radial extension of the braking races (520; 720).

8. The rim according to claim 4 wherein at least one of said structural fibers having said indicating color is selected from the group consisting of aramid, ceramic and glass fibers.

9. The rim according to claim 8 wherein said at least one colored fiber is an aramid fiber and the at least one outer layer is made from composite material comprising carbon fibers in a matrix of polymeric material.

10. The rim according to claim 9 wherein all of the structural fibers of the middle layer are colored fibers.

11. The rim according to claim 3 wherein the middle layer is made from composite material with structural fibers in a matrix of polymeric material and wherein said matrix of polymeric material has said indicating color.

12. The rim according to claim 2 wherein the visible characteristic is visible through a valve hole (51) or a spoke attachment hole.

13. The rim according to claim 2 wherein the predetermined level of wear corresponds to a complete wear of the at least one outer layer at the braking races.

14. The rim according to claim 2 wherein the predetermined level of wear corresponds to a complete wear of the middle layer at the braking races.

15. The rim according to claim 13 wherein the at least one outer layer has a thickness of between 0.1 and 0.8 mm.

16. The rim according to claim 15 wherein the at least one outer layer has a thickness of between 0.3 and 0.5 mm.

17. The rim according to claim 16 wherein the middle layer has a thickness of between 0.2 and 1 mm.

18. The rim according to claim 17 wherein the middle layer has a thickness of between 0.4 and 0.8 mm.

19. The rim according to claim 15 wherein the middle layer has a thickness of between 0.2 and 1 mm.

20. The rim according to claim 19 wherein the middle layer has a thickness of between 0.4 and 0.8 mm.

21. The rim according to claim 1 wherein the wear indicator comprises a metallic element (1045).

22. The rim according to claim 21 wherein the wear indicator is incorporated in composite material.

23. The rim according to claim 1 wherein the wear indicator comprises an inductive sensor (1149).

24. The rim according to claim 23 wherein the wear indicator is incorporated in composite material.

25. The rim according to claim 1 wherein the wear indicator extends in a circumferential direction on at least one part of the rim.

26. The rim according to claim 25 wherein the wear indicator extends in the circumferential direction on a totality of the rim.

27. The rim according to claim 1 wherein the at least one wear indicator is provided at just one of the braking races.

28. The rim according to claim 1 wherein the at least one wear indicator (40; 140; 340; 540; 840; 940; 1040; 1140) is provided at each of the braking races (20; 120; 320; 520; 820; 920; 1020; 1120).

29. The rim according to claim 1 wherein the wear indicator extends in a radial direction past a radial extent of the braking races.

30. The rim according to claim 1 wherein the braking races (20; 520; 820; 920; 1020) are connected by the upper bridge (10; 510; 810; 910; 1010) and by a lower bridge (15; 515; 815; 915; 1015), and wherein the wear indicator (40; 540; 840; 940; 1040) extends at at least one of the braking races (20; 520; 820; 920; 1020) and at the upper bridge (10; 510; 810; 910; 1010).

31. The rim according to claim 1 wherein the braking races (820) are connected by the upper bridge (810) and by a lower bridge (815), and wherein the wear indicator (840) extends at at least one of the braking races (820) and at the lower bridge (815).

32. The rim according to claim 1 wherein the wear indicator extends in a radial direction for a height that is lower than the height of the braking races.

33. The rim according to claim 1 wherein the rim also comprises at least one middle layer comprising the at least one wear indicator in a middle inner position with respect to the at least one outer layer.

34. The rim according to claim 33 wherein the at least one middle layer has structural capacity.

35. The rim according to claim 34 wherein the at least one middle layer is made from composite material with structural fibers in a matrix of polymeric material.

36. The rim according to claim 35 wherein the structural fibers are aramid, glass, or ceramic fibers.

37. The rim according to claim 33 comprising an inner layer, in a further inner position with respect to the at least one middle layer.

38. The rim according to claim 37 wherein the inner layer is of a different type than the at least one middle layer.

39. The rim according to claim 38 wherein the wear indicator (40; 140; 240; 340; 440; 540; 640; 740; 840; 940) can be detected through a valve hole (51) or a spoke attachment hole.

40. The rim according to claim 37 wherein the inner layer is of the same type as the at least one outer layer.

41. The rim according to claim 1 wherein the at least one outer layer is made from composite material with structural fibers in a matrix of polymeric material.

42. The rim according to claim 41 wherein the at least one outer layer further comprises a plurality of sheets of composite material one on top of the other.

43. The rim according to claim 42 wherein said plurality of sheets have a thickness of between 0.1 and 0.3 mm.

44. The rim according to claim 41 wherein the composite material comprises bidirectional structural fibres.

45. The rim according to claim 1 wherein the at least one outer layer does not have structural capacities.

46. The rim according to claim 1 wherein the wear indicator (40; 140; 240; 340; 440; 540; 640; 740; 840; 940; 1040; 1140) can also be detected when the rim is not yet worn.

47. The rim according to claim 46 wherein the wear indicator (1040; 1140) can be detected by X-rays.

48. A bicycle wheel comprising the composite bicycle rim according to claim 1.

49. A composite wheel rim comprising:
multiple layers of composite materials that define a lower bridge, an upper bridge and opposing sides extending between the lower bridge and the upper bridge, the upper bridge having two thickened end portions comprised of folded sheets of composite material and enclosed by an outermost layer of the multiple layers of composite materials, a braking race on an exterior surface of at least one side, an intermediate layer arranged radially below the folded sheets of composite material such that contact between the outermost layer and the folded sheets of composite material is uninterrupted, the intermediate layer having a wear indicator positioned within the at least one side inwardly from and opposite the braking race at a predetermined position from the braking race so that the wear indicator signifies a need to check the rim when the braking race is worn to the predetermined position.

50. The rim according to claim 49 wherein the multiple layers further comprise an innermost layer, and the intermediate layer has a color different from the outermost layer.

51. The rim according to claim 50 wherein the intermediate layer is a composite material comprising structural fibers in a matrix of polymeric material, the structural fibers comprising at least one fiber having a color different from the outermost layer.

52. The rim according to claim 51 wherein the at least one fiber (45) having a color different from the outermost layer (25; 125; 225; 325; 425; 525; 625; 725; 825; 925) wraps continuously around an entire radial extension of the braking race (520; 720).

53. The rim according to claim 51 wherein the at least one fiber having a color different from the outermost layer is selected from the group consisting of aramid, ceramic, and glass fibers.

54. The rim according to claim 50 wherein the outermost layer and the intermediate layer are composite material comprising carbon fibers in a matrix of polymeric material, the carbon fibers of the intermediate layer comprising at least one fiber having a color different from the outermost layer.

55. The rim according to claim 50 wherein the wear indicator (40; 140; 240; 340; 540; 640; 740; 840; 940; 1040; 1140) is visible through a valve hole (51) or a spoke attachment hole.

56. The rim according claim 50 wherein the predetermined position is a complete wear of the outermost layer at the braking race.

57. The rim according to claim 50 wherein the intermediate layer is a composite material with structural fibers in a matrix of polymeric material.

58. The rim according to claim 57 wherein the structural fibers are selected from the group consisting of aramid, glass, and ceramic fibers.

59. The rim according to claim 50 wherein the outermost layer is made from composite material with structural fibers in a matrix of polymeric material.

60. The rim according to claim 59 wherein the composite material comprises bidirectional structural fibers.

61. The rim according to claim 50 wherein the outermost layer does not have structural capacities.

62. The rim according to claim 50 wherein the innermost layer is in an inner position with respect to the intermediate layer.

63. The rim according to claim 50 wherein
the innermost layer and the intermediate layer have different characteristics, and
the innermost layer and the outermost layer have the same characteristics.

64. The rim according to claim 50 wherein the predetermined position is a complete wear of the intermediate layer at the braking race.

65. The rim according to claim 50 wherein the outermost layer has a thickness of between 0.1 and 0.8 mm.

66. The rim according to claim 50 wherein the intermediate layer has a thickness of between 0.2 and 1 mm.

67. The rim according to claim 49 wherein the wear indicator (40; 140; 240; 340; 540; 640; 740; 840; 940; 1040; 1140) comprises a metallic element (1045) or an inductive sensor (1149).

68. The rim according to claim 49 wherein the wear indicator is incorporated in composite material.

69. The rim according to claim 49 wherein the wear indicator extends in a circumferential direction on at least one part of the rim.

70. The rim according to claim 49 wherein the wear indicator is positioned at the braking race.

71. The rim according to claim 49 wherein the wear indicator extends in a radial direction of the rim past a radial extent of the braking race.

72. The rim according to claim 49 wherein the braking race (20; 120; 220; 320; 520; 620; 720; 820; 920; 1020; 1120) is connected to at least one of the bridges, and wherein the wear indicator (40; 540; 840; 940; 1040) extends at the braking race (20; 120; 220; 320; 520; 620; 720; 820; 920; 1020; 1120) and at the upper bridge (10; 510; 810; 910; 1010).

73. The rim according to claim 49 wherein the outermost layer comprises at least two sheets of layered composite material.

74. The rim according to claim 73 wherein the sheets have a thickness of between 0.1 and 0.3 mm.

75. The rim according to claim 49 wherein the wear indicator (40; 140; 240; 340; 540; 640; 740; 840; 940; 1040; 1140) is X-ray detectable.

76. The rim according to claim 49 wherein the wear indicator (40; 140; 240; 340; 540; 640; 740; 840; 940; 1040; 1140) is detectable through an aperture in the rim.

77. A bicycle wheel comprising a rim according to claim 49.

78. A composite bicycle wheel rim comprising:
multiple layers of composite materials that define a lower bridge, an upper bridge, left and right sides extending between the lower bridge and the upper bridge, and defined braking surfaces on an outermost layer of the multiple layers that is subject to wear as a consequence of braking, the upper bridge having two thickened end portions comprised of folded sheets of composite material and enclosed by the outermost layer,
an intermediate layer of the multiple layers arranged radially below the folded sheets of composite material such that contact between the outermost layer and the folded sheets of composite material is uninterrupted, the intermediate layer including a wear indicator positioned inwardly from and opposite at least one of the braking surfaces at a predetermined depth from the at least one of the braking surfaces so that the wear indicator becomes exposed when the at least one of the braking surfaces is worn to the predetermined depth.

79. A composite bicycle wheel rim comprising:
an outer layer, an inner layer, and at least one intermediate layer of composite material,
at least the outer and inner layers defining a lower bridge, an upper bridge having two thickened end portions comprised of folded sheets of composite material and enclosed by the outer layer, and left and right sides extending between the lower and upper bridges, with a braking surface on at least one side of the outer layer, the at least one intermediate layer arranged radially below the folded sheets of composite material such that contact between the outer layer and the folded sheets of composite material is uninterrupted, the at least one intermediate layer having a wear indicator positioned at a predetermined depth underneath the outer layer so that it becomes exposed when the braking surface is worn to the predetermined depth.

80. The rim according to claim 79 wherein the wear indicator is a colored fiber.

81. The rim according to claim 79 wherein the colored fiber is comprised of a material selected from group consisting of aramid, ceramic, and glass materials.

82. The rim according claim 79 wherein the predetermined depth indicates that the outermost layer at the braking surface is completely worn.

83. The rim according to claim 79 wherein the intermediate layer has a thickness of between 0.2 and 1 mm.

84. The rim according to claim 79 wherein the wear indicator (40; 140; 240; 340; 540; 640; 740; 840; 940; 1040; 1140) is a metallic element (1045) positioned within the composite material.

85. The rim according to claim 79 wherein the wear indicator (40; 140; 240; 340; 540; 640; 740; 840; 940; 1040; 1140) is an inductive sensor (1149).

86. The rim according to claim 85 wherein the inductive sensor (1149) is positioned within the composite material.

87. The rim according to claim 79 wherein the outer layer is comprised of at least two sheets of composite material with bidirectional structural fibers in a matrix of polymeric material.

88. The rim according to claim 87 wherein the at least two sheets each have a thickness of between 0.1 and 0.3 mm.

89. The rim according to claim 79 wherein the outer layer is non-structural.

90. The rim according to claim 79 wherein the inner layer and the outer layer have the same structural characteristics.

91. The rim according to claim 79, wherein the wear indicator (40; 140; 240; 340; 540; 640; 740; 840; 940; 1040; 1140) is X-ray detectable.

92. The rim according to claim 79, wherein the wear indicator (40; 140; 240; 340; 540; 640; 740; 840; 940; 1040; 1140) is position detectable through a hole in the rim.

* * * * *